April 11, 1939.    H. OMMUNDSON    2,153,674
SHAFT SEAL
Filed July 14, 1937
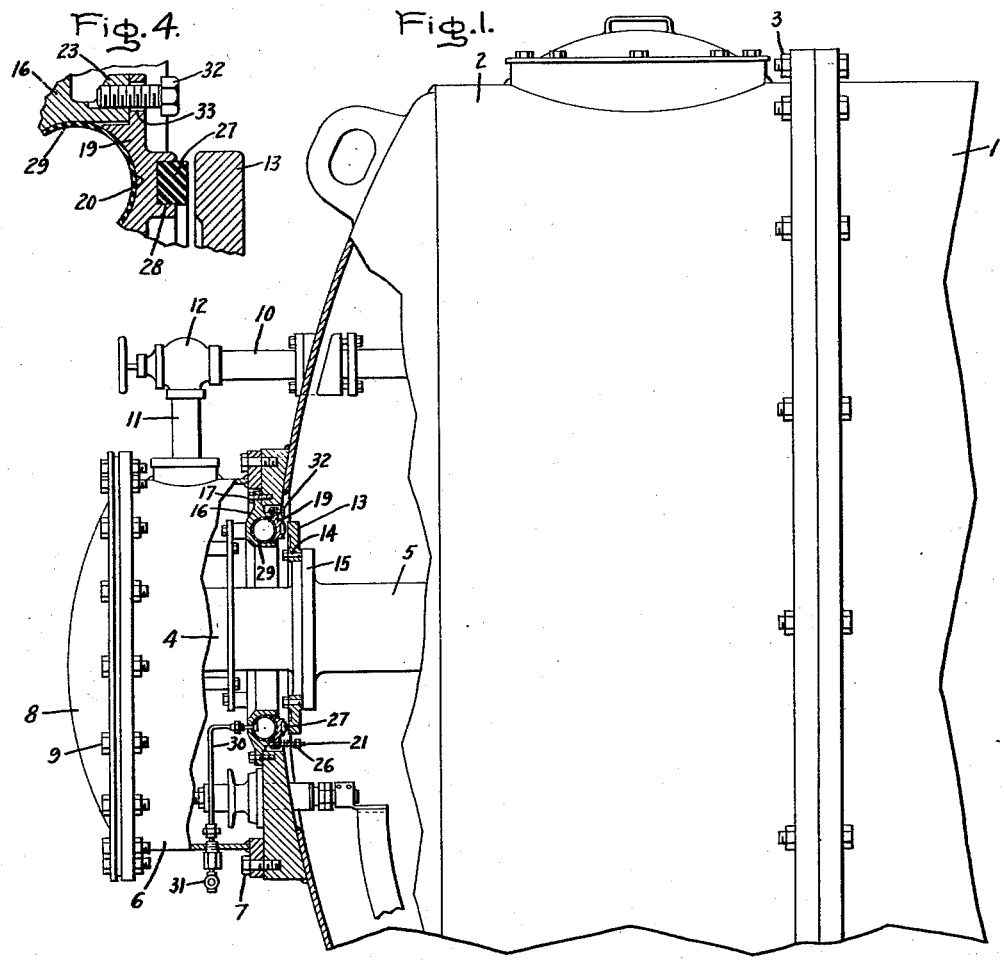
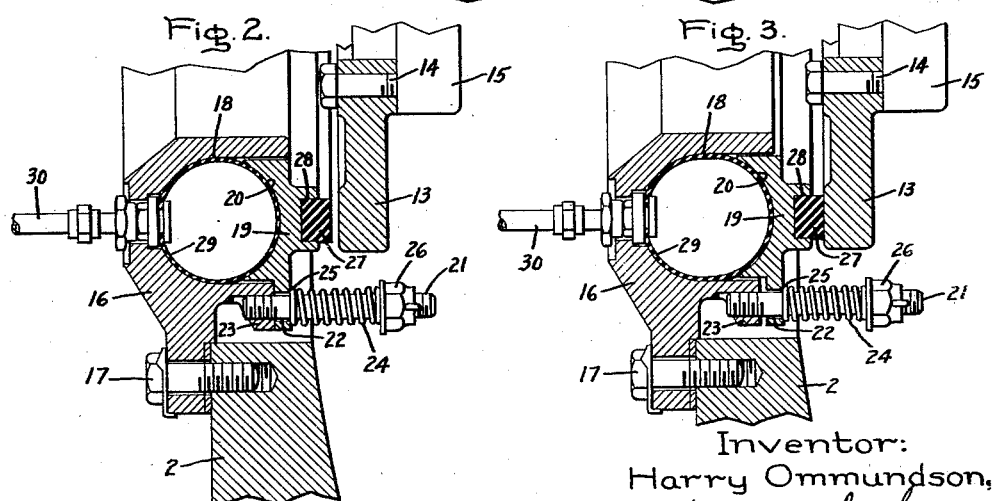
Inventor:
Harry Ommundson,
by Harry E. Dunham
His Attorney.

Patented Apr. 11, 1939

2,153,674

UNITED STATES PATENT OFFICE 2,153,674

SHAFT SEAL

Harry Ommundson, Schenectady, N. Y., assignor to General Electric Company, a corporation of New York Application July 14, 1937, Serial No. 153,572

3 Claims. (Cl. 137—139)

My invention relates to shaft seals.

An object of my invention is to provide an improved seal for a shaft or other rotatable member of a machine.

Further objects and advantages of my invention will become apparent and my invention will be better understood from the following description referring to the accompanying drawing, and the features of novelty which characterize my invention will be pointed out with particularity in the claims annexed to and forming part of this specification.

In the drawing, Fig. 1 is a side elevation of a totally enclosed dynamo-electric machine embodying my invention, partly broken away to more clearly illustrate the seal construction; Fig. 2 is an enlarged fragmentary sectional view of the sealing device shown in Fig. 1 in its normal operating open position; Fig. 3 is an enlarged fragmentary sectional view like Fig. 2 of the sealing device in a closed position; and Fig. 4 is an enlarged fragmentary sectional view of the sealing device illustrating the arrangement for limiting the axial movement of the seal.

Referring to the drawing, I have shown my invention as applied to a totally enclosed dynamo-electric machine. The stationary and rotatable members of this machine are enclosed in a cylindrical housing 1 having an end head 2 bolted thereto at 3. It is often desirable to cool this type of machine with a gas such as hydrogen, and, therefore, the machine must be enclosed in a casing which is substantially gas-tight to prevent leakage of the hydrogen from the casing into the atmosphere. In order to facilitate inspection and adjustment of the current-collecting devices of such a machine, it is desirable that these current-collecting devices be arranged in an auxiliary housing which can be sealed from the main casing, and in order to avoid continuous wearing of the seal during normal operation of the machine, it has been found desirable to provide a normal open seal which can be closed during the inspection periods. To obtain these advantages, these devices are mounted upon an extension 4 of the shaft 5 of the rotatable member of the dynamo-electric machine. These current-collecting devices are enclosed in a gas-tight casing 6 which is secured by screws 7 to the end head 2, and is provided with a removable cover 8 secured thereto by bolts 9. The cooling gas which is circulated within the main casing 1 of the dynamo-electric machine also is supplied to the current-collecting devices casing 6 through pipes 10 and 11, which are connected together by a valve 12 which may be closed when the seal is closed to shut off the supply of cooling gas from the main casing 1 to the supplementary casing 6.

As can be seen in Fig. 1, the seal includes a rotatable part provided with an annular sealing ring 13 secured by screws 14 to an annular flange 15 formed on the shaft 5. Adjacent the sealing ring 13, I provide a stationary annular part 16 secured to the casing end head 2 by screws 17 and having an annular groove 18 extending around the face of one side thereof adjacent the sealing ring 13. The annular groove 18 has parallel sides and is made half-round between the parallel sides. An axially movable annular element or ring 19 is supported in axially slidable relation within the groove 18 in the stationary ring 16, and is provided with a half-round groove 20 arranged in complementary relationship to the inner half-round end of the groove 18, thereby providing an annular tubular chamber between the stationary ring 16 and the axially movable ring 19. A plurality of resilient biasing devices is arranged in circumferentially spaced relation about the periphery of the axially movable ring 19 and includes studs 21 extending through openings 22 formed in the outer periphery of the ring 19 and threadedly engaging openings formed in an annular flange 23 of the stationary ring 16. The axially movable ring 19 is biased out of engagement with the rotatable sealing ring 13 by springs 24 secured under compression between spring seats 25 engaging the ring 19 and nuts 26 threadedly secured to the outer ends of the studs 21. In order to provide a better wearing and sealing surface, a sealing ring 27 of resilient rubber or similar material is secured within an annular groove 28 formed in the face of the axially movable ring 19 on the side thereof adjacent the sealing ring 13. In order to close the seal, an extensible resilient annular member or tubular diaphragm 29 of resilient rubber or similar material is arranged within the annular groove 18 between the stationary ring 16 and the axially movable ring 19. A fluid supply tube 30 is arranged in communication with the interior of the annular extensible diaphragm 29, and is connected to a valve 31 through which a fluid, such as compressed air, may be pumped into the extensible diaphragm 29 so that it will engage the half-round walls of the groove 18 and the half-round wall of the groove 20, so as to provide a gas-tight seal therebetween. Upon further inflation of the diaphragm 29, it will become extended and move the axially movable ring 19 toward the rotatable sealing ring 13. In order to completely close the seal between the main casing 1 and the supplementary casing 6, the diaphragm 29 is extended, against the biasing action of the springs 24, until the resilient tubular rubber ring 27 is moved into contact with the rotatable ring 13 and frictionally engages the adjacent surface thereof and forms a gas-tight seal therebetween, as shown in Fig. 3. In this manner, a gas-tight seal is formed between the main dynamo-electric machine casing 1 and the supplementary current-collecting device casing 6. Furthermore, the wear on the resilient rubber sealing ring 27 is minimized by having this sealing ring normally biased out of contact with the rotatable sealing ring by the springs 24. In order to insure against a metal to metal contact between the rotatable sealing ring 13 and the axially movable ring 19, I provide a plurality of circumferentially spaced apart stops for limiting the axial movement of the axially movable ring 19, comprising a plurality of screws 32 loosely extending through openings 33 formed through the outer periphery of the ring 19 and threadedly engaging openings formed in the flange 23 of the stationary ring 16. The distance between the head of the screws 32 and the adjacent surface of the ring 19 is slightly less than the distance between the rotatable sealing ring 13 and the surface of the axially movable ring 19 adjacent the sealing ring 13 when the sealing ring 19 is biased to its full open or retracted position, as shown in Fig. 4. In this manner, the head of the screws 32 limit the axial movement of the ring 19 to such a distance that it cannot be biased into engagement with the adjacent surface of the sealing ring 13, and thereby prevents damage which might result from engagement of these surfaces.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A shaft seal comprising a rotatable part, a stationary part adjacent said rotatable part, an axially movable element supported on said stationary part, resilient means for biasing said axially movable element out of contact with said rotatable part, an extensible member arranged between said stationary part and said axially movable element, and means for supplying fluid to said extensible member to extend the same and move said axially movable element into contact with said rotatable part to close said seal.

2. A shaft seal comprising a rotatable part, a stationary part having an annular groove adjacent said rotatable part, an axially movable element provided with a sealing ring projecting axially therefrom supported in said stationary part groove and having a complementary groove cooperating therewith, an annular extensible member arranged in said grooves between said stationary part and said axially movable part, means for supplying fluid to said extensible member to extend the same and to move said axially movable element into contact with said rotatable part to close said seal, and means for limiting the axial movement of said axially movable element to less than the distance from said rotatable part to the adjacent surface of said axially movable element when said latter element is in fully retracted position.

3. A shaft seal comprising a rotatable part, a stationary part having an annular groove adjacent said rotatable part, an axially movable element supported in said groove of said stationary part and having a complementary groove cooperating therewith, resilient means for biasing said axially movable element out of contact with said rotatable part, an annular tubular extensible member arranged in said grooves between said stationary part and said axially movable element, means for supplying fluid to said extensible member to extend the same and to move said axially movable element into contact with said rotatable part to close said seal, and means for limiting the axial movement of said axially movable element.

HARRY OMMUNDSON.